United States Patent [19]

Hillig et al.

[11] Patent Number: 4,810,442

[45] Date of Patent: Mar. 7, 1989

[54] METHOD OF FORMING FIBER- AND FILAMENT-CONTAINING CERAMIC PREFORM AND COMPOSITE

[75] Inventors: William B. Hillig, Ballston Lake; Henry C. McGuigan, Schenectady, both of N.Y.

[73] Assignee: General Electric Company, Schenectady, N.Y.

[21] Appl. No.: 947,203

[22] Filed: Dec. 29, 1986

[51] Int. Cl.$^4$ ............................................. C04B 33/28
[52] U.S. Cl. ........................................ 264/60; 264/86; 264/87; 501/95
[58] Field of Search ................. 264/86, 87, 60; 501/95

[56] References Cited

U.S. PATENT DOCUMENTS

| | | | |
|---|---|---|---|
| 3,500,444 | 3/1970 | Hesse et al. | 264/86 |
| 3,736,159 | 5/1973 | Gibson et al. | |
| 3,932,161 | 1/1976 | McNish | 264/60 |
| 4,158,687 | 6/1979 | Yajima et al. | 264/60 |
| 4,568,594 | 2/1986 | Hordonneau | 264/60 |

OTHER PUBLICATIONS

J. V. Milewski, "Efficient Use of Whiskers in the Reinforcement of Ceramics", Advanced Ceramic Materials, vol. 1, No. 1, 1986, pp. 36–41.

*Primary Examiner*—James Derrington
*Attorney, Agent, or Firm*—Jane M. Binkowski; James C. Davis, Jr.; James Magee, Jr.

[57] ABSTRACT

A fiber- and filament-containing ceramic preform comprises of a mixture of discontinuous fibers and particulates surrounding a layer of continuous filaments extending substantially through the mixture is procduced and infiltrated with a molten ceramic to produce a composite.

15 Claims, No Drawings

METHOD OF FORMING FIBER- AND FILAMENT-CONTAINING CERAMIC PREFORM AND COMPOSITE

The following pending U.S. patent applications by W. B. Hillig and H. C. McGuigan are assigned to the assignee hereof and are incorporated herein by reference:

Ser. No. 937,272 filed Dec. 3, 1986. now U.S. Pat. No. 4,769,349, for "Ceramic Fiber Casting" discloses a process for producing a slip-cast ceramic body by preparing a slip of ceramic material suspended in a liquid vehicle wherein the ceramic material is a mixture of fibers and particulates with the volume ratio of fibers to particulates ranges from about 1:5 to about 1:1, said ceramic material being present in an amount greater than about 4% by volume of the slip, said fibers being present in an amount greater than 2% by volume of said slip, and casting the slip in a porous mold.

Ser. No. 944,097, filed Dec. 22, 1986 for "Moldable Fiber-Containing Ceramic Mass" discloses the production of a moldable ceramic mass by preparing a suspension of ceramic material in a liquid vehicle wherein the ceramic material is a mixture of fibers and particulates of a ceramic selected from the group consisting of aluminum oxide, beryllium oxide, silicon carbide, silicon nitride, titanium carbide, titanium diboride, zirconium carbide and zirconium diboride wherein the volume ratio of fibers to particulates ranges from about 1:5 to about 1:1, said ceramic material being present in an amount greater than about 4% by volume of the suspension, said fibers being present in an amount greater than about 2% by volume of the suspension, and removing a sufficient portion of the liquid vehicle to produce a moldable ceramic mass.

In one aspect, this invention relates to the production of a discontinuous fiber- and continuous filament-containing ceramic preform by means of slip casting and/or by utilizing a moldable ceramic mass. In another aspect, this invention relates to the infiltration of the preform with a molten ceramic to produce a composite in which the preform comprises the reinforcing phase.

Because of geometric interference, rod-like materials (whiskers) do not pack well, but tend to form hedgehog-like balls ("fuzzballs"). This typically occurs when stirring or mixing even slightly concentrated suspensions of whiskers, or when agitating dry whiskers as during sieving. Usually, it is necessary to disperse whiskers in very dilute suspensions in order to separate them, and then to handle them as little as possible to avoid the reformation of fuzzballs. Such dilute suspensions of whiskers are not useful for producing dense bodies, i.e. greater than about 25% by volume of solids, by slip casting. By reducing the aspect (length-to-diameter (L/D)) ratio of the whiskers, greater packing in the suspension is possible before pilling occurs. However, such reduction often degrades the desired property benefit from the fibers.

The goal of ceramic composites for aircraft engines is the attainment of low density, strong, high temperature structural materials that are adequately tough, damage tolerant, and resistant to catastrophic failure. Small fibers, such as whiskers, can confer toughness on the composite, as is evidenced by the substantial increase in $K_c$ observed for example when SiC whiskers are introduced into an aluminum matrix. However, such discontinuous fibers provide relatively little reserve strength once the matrix cracks. On the other hand large diameter, continuous filament reinforcement is attractive from the point of view of providing reserve strength, should the ceramic matrix phase crack. However, such continuous filaments do not contribute to the toughness of the matrix itself. Therefore, the use of a whisker reinforced matrix to bond together the large diameter continuous filaments offers the potential of (1) a higher working strain for the composite prior to matrix failure and (2) reserve strength should such matrix failure occur.

According to the present invention, a suspension of a mixture of ceramic fibers and particulates in a liquid vehicle is produced. In one embodiment, the suspension is cast on or into a porous mold to form a layer of a slip-cast compact, a layer of continuous filaments is preferably impressed into the layer of compact while still moist and then the suspension is deposited on the filaments to form another layer of the compact which at least covers the layer of filaments producing a compact comprised of a layer of filaments surrounded by a mixture of fibers and particulates.

In another embodiment, a sufficient amount of liquid vehicle is removed from the suspension of ceramic fibers and particulates to produce a moldable mass which is molded to form a first layer of a molded compact, a layer of continuous filaments is preferably impressed into the molded layer while still moist, and then another layer of the moldable ceramic mass is deposited over the filaments and pressed thereon to produce the compact. This process can be repeated to build up multiple layers of filaments embedded in the moldable ceramic mass.

Briefly stated, the present suspension is comprised of ceramic material suspended in a liquid vehicle, said ceramic material being comprised of fibers and particulates, said fibers having an aspect ratio ranging from about 10 to less than about 200 and being selected from the group consisting of aluminum oxide, beryllium oxide, silicon carbide, silicon nitride, titanium carbide, titanium diboride, zirconium carbide, zirconium diboride and a mixture thereof, at least about 90% by volume of said particulates being filler particulates selected from the group consisting of aluminum oxide, beryllium oxide, silicon carbide, silicon nitride, titanium carbide, titanium diboride, zirconium carbide, zirconium diboride and a mixture thereof, from 0 to about 10% by volume of said particulates being comprised of a ceramic material which has a melting point ranging from about 1000° C. to about 100° C. below the melting or decomposition point of said fibers and filler particulates and in its molten state wets said fibers and filler particulates, the volume ratio of said fibers to said particulates ranging from about 1:5 to about 1:1, said particulates having an equivalent diameter ranging from greater than about $0.2\mu$ to less than about $3\mu$, said ceramic material being present in an amount greater than about 4% by volume of said suspension, said ceramic fibers present in an amount greater than about 2% by volume of said suspension.

By "particulates" it is meant herein particles wherein the ratio of the largest to the smallest dimension is less than about 10. Also, the largest dimension of the particulates should be less than about ½ of the length of the fibers used in the present invention. Ceramic material in other forms such as for example, flakes, is not useful in the present invention.

By "fiber" or "ceramic fiber", it is meant herein short fiber, chopped fiber, whisker and mixture thereof, i.e. a discontinuous fiber. The present discontinuous fiber can be crystalline, amorphous or a mixture thereof. Specifically, short or chopped fibers can be crystalline or amorphous and the whiskers are crystalline.

Generally, the present ceramic fiber has an aspect ratio ranging from about 10 to less than about 200, and preferably from about 20 to less than about 100. Generally, the ceramic fiber may range in diameter from about 0.2 micron to about 10 microns, and preferably from about 0.5 micron to about 10 microns. It may range in length from about 10 microns to about 2000 microns, and preferably from about 20 microns to about 1000 microns.

The present ceramic fiber is selected from the group consisting of aluminum oxide, beryllium oxide, silicon carbide, silicon nitride, titanium carbide, titanium diboride, zirconium carbide, zirconium diboride and a mixture of said fibers.

The ceramic particulates used in the present suspension have an equivalent diameter ranging from greater than about 0.2 micron to less than about 3 microns. By equivalent diameter of a particulate herein it is meant the diameter of a sphere which occupies the same volume as does the particulate. Generally, particulates outside this range do not produce useful slips or suspensions. The particulates can be amorphous, crystalline or a mixture thereof.

At least about 90% by volume, and frequently about 100% by volume, of the total volume of ceramic particulates is comprised of filler particulates selected from the group consisting of aluminum oxide, beryllium oxide, silicon carbide, silicon nitride, titanium carbide, titanium diboride, zirconium carbide, zirconium diboride and a mixture thereof.

From 0 to about 10% by volume, frequently from about 1% by volume to about 5% by volume, of the total volume of ceramic particulates may be comprised of a meltable ceramic which is an in situ matrix forming material which generally is of substantially the same composition as the externally introduced molten ceramic used to infiltrate the present preform to form a composite. The present matrix-forming material, i.e. the in situ matrix-forming material and the matrix-forming ceramic infiltrated into the preform to produce a composite, has a melting point ranging from a minimum of about 1000° C. to a maximum of about 100° C. below the melting or decomposition point of the fibers, filaments and filler particulates. Preferably, the matrix-forming material has a melting point ranging from about 1400° C. to about 2000° C. but which is at least about 100° C. below the melting or decomposition point of the fibers, filaments and filler particulates. When molten, the matrix-forming ceramic material wets the fibers, filaments and filler particulates, i.e. it forms a contact or wetting angle of less than 90° with the fibers, filaments and filler particulates. During infiltration of the present slip-cast and/or molded preform, the in situ matrix-forming material is molten and wets the fibers, filaments and filler particulates sufficiently to significantly promote infiltration of the externally introduced matrix-forming infiltrant. There is no reaction product formed between the matrix-forming material and the fibers, filler particulates and filaments which is detectable by scanning electron microscopy.

Representative of useful matrix-forming materials are the infiltrants disclosed in copending Ser. No. 759,815 filed July 29, 1985, now U.S. Pat. No. 4,636,480 for "Composite By Infiltration" for W. B. Hillig, assigned to the assignee hereof and incorporated herein by reference. Specifically, the present matrix-forming material can be selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of at least about 10% by volume of said fluoride and a metal oxide wherein said mixture of said fluoride and metal oxide has a liquidus temperature ranging from above 1000° C. to below about 1500° C. Representative of useful metal oxides are magnesium oxide, calcium oxide, alumina and a mixture thereof.

Representative of additional matrix-forming materials are the infiltrants disclosed in copending Ser. No. 803,172 filed Dec. 2, 1985, now U.S. Pat. No. 4,725,567 for "Composite By Infiltration" for W. B. Hillig, assigned to the assignee hereof and incorporated herein by reference. Specifically, the present matrix-forming material can be an alkaline earth silicate represented in terms of its oxidic constituents, i.e. MO and $SiO_2$, by the general formula of $xMO \cdot zSiO_2$ wherein M=Ba, Ca, Mg, Sr and a mixture thereof, and where x is 1, 2 or 3 and z is 1, 2 or 3. The matrix-forming material also can be an alkaline earth aluminosilicate represented in terms of its oxidic constituents, i.e. M'O, $Al_2O_3$ and $SiO_2$, by the general formula $xM'O \cdot yAl_2O_3 \cdot zSiO_2$ where M'=Ba, Ca, Mg, Sr and a mixture thereof, where x is 1, 2, 4 or 6, y is 1, 2, 5 or 9 and z is 1, 2 or 5. Each oxidic constituent can range up to ±50%, preferably less than ±10%, from its stoichiometric composition. The matrix-forming material has a liquidus temperature ranging from about 1250° C. to about 1850° C.

The liquid vehicle used in forming the suspension is a liquid under ambient conditions in which the ceramic material can be effectively dispersed. Generally, the liquid vehicle is one which evaporates away at ambient pressure or under a partial vacuum at a temperature ranging from about ambient to about 100° C. leaving no residue or no residue detectable by x-ray diffraction analysis. Preferably, the liquid vehicle has a boiling point ranging from greater than about 30° C. to about 100° C. at ambient pressure. Representative of suitable liquid vehicles are water, methyl alcohol, ethyl alcohol, isopropyl alcohol and a mixture thereof.

Frequently, a deflocculant is used in forming the suspension. The deflocculant can be an organic or inorganic material and should be soluble in the liquid vehicle. The deflocculant need only be used in an amount which effectively aids in dispersing the ceramic material and such amount is determinable empirically. Generally, the deflocculant is used in an amount of less than about 5% by volume of the total volume of liquid vehicle. The deflocculant should be a material which can be volatilized away from the slip-cast body at a temperature ranging from ambient to about 600° C. leaving no amount thereof detectable by x-ray diffraction analysis. Representative of useful deflocculants are oleic acid and tetramethyl ammonium hydroxide.

As used herein, the term "suspension" includes slip and slurry.

The amount of ceramic material used in forming the suspension is greater than about 4% by volume, generally ranging from greater than about 5% by volume, to about 30% by volume of the total volume of suspension. The amount of ceramic fibers in the suspension is greater than about 2% by volume, preferably greater than about 4% by volume, of the total volume of suspension. The ceramic material is at least significantly or substantially uniformly dispersed in the suspension. The viscosity of the suspension can be adjusted by adjusting the concentration of ceramic material therein. The suspension is a pourable fluid under ambient conditions and generally has the consistency of pourable heavy cream.

The volume ratio of fibers to particulates in the ceramic material ranges from about 1:5 to about 1:1, and frequently from about 1:5 to about 3:5. The particular volume ratio of fibers to particulates is determinable empirically and depends largely on the aspect ratio of the fibers. Generally, the larger the aspect ratio of fibers, the larger are the spaces between them and the larger are the amounts of ceramic particulates required to produce the present suspension. The particulates inhibit the reformation of fuzzballs.

The suspension can be formed in a conventional manner by mixing all of its components generally at ambient temperature and pressure. Generally, the suspension is formed by ball-milling the components provided the ball-milling has no significant deleterious effect on the fibers. Ultrasonic agitation can also be used, for example, by placing a container of the suspension in a standard laboratory ultrasonic cleaning bath. The particulates assist in the breakdown of the fuzzballs of fibers during ball-milling or ultrasonic agitation.

By "filament" or "continuous filament" it is meant herein a ceramic filament having a diameter greater than about 5 microns and frequently greater than about 10 microns. The filament may be as long as desired. It should be as long as required for producing the present compact or preform. Generally, it is longer than about 1000 microns and frequently it is longer than about 2000 microns.

The filament has a melting or decomposition point which is above 1000° C., and usually above 1500° C. It is comprised of a material which is at least substantially non-reactive with any of the components of the preform and resulting composite. The filament forms no reaction product, i.e. above 1000° C., with any components of the preform or resulting composite which is detectable by scanning electron microscopy.

Representative of a useful ceramic filament is one comprised of a carbon core completely coated with a ceramic such as aluminum oxide, beryllium oxide, silicon carbide, silicon nitride, titanium carbide, titanium diboride, zirconium carbide, zirconium diboride or a mixture thereof.

Another useful filament is a Si—C containing-filament which contains at least about 50% by weight of silicon and at least about 25% by weight of carbon, based on the weight of the filament. Examples of Si—C containing filaments are SiC, Si—C—O, Si—C—O—N and Si—C—O—N—Ti. Si—C containing filaments containing oxygen are available commercially under the trademark Nicalon which generally range in composition from about 57% by weight Si, 27% by weight C, 16% by weight O to about 56% by weight Si, 34% by weight C, 10% by weight O, based on the weight of the filament.

Another useful filament is a Si-N-containing filament which contains at least about 50% by weight silicon and at least about 30% by weight nitrogen, based on the weight of the filament. Examples of Si-N containing filaments are $Si_3N_4$, Si—N—O, Si—N—O—C and Si—N—O—C—Ti.

There are processes known in the art which use organic precursors to produce Si—C and Si—N containing filaments. These processes may introduce a wide variety of elements into the filaments and usually the filaments contain oxygen.

SLIP CASTING EMBODIMENT

In order to carry out the slip casting process, a porous mold is provided which is capable of extracting the liquid vehicle from the suspension. The liquid vehicle can be extracted by being absorbed by the porous mold generally under ambient conditions, or it can be extracted by vacuum drawing the liquid vehicle through the porous mold. The mold should be of a form which allows the formation of at least a layer or part of the desired compact and allows recovery of said layer or part. The mold can be made of a variety of materials known in the art as useful for forming porous molds for slip casting and frequently it is plaster of paris.

The suspension is poured on or into the mold in the desired amount and the liquid vehicle is extracted therefrom. As the liquid vehicle is extracted, the solids of the suspension are deposited on the mold surface. Slip casting may be continued until the desired ceramic layer or part of the compact is produced.

Preferably, before the slip-cast layer is dry, a layer of filaments is deposited thereon. The filaments may be deposited by a number of techniques. The filaments of the deposited layer are positioned at least substantially parallel to each other and extend at least substantially across the slip-cast layer or part, i.e. from one side or peripheral portion thereof to the opposite side or peripheral portion. If desired, the filaments may extend beyond the layer. Usually the filaments are deposited on the slip cast layer so as to produce a volume fraction of filaments within the formed structure ranging from about 0.1 to 0.6. However, there should be no significant contact between the filaments and preferably the filaments are spaced so that there is no contact therebetween. Significant contact between the filaments may cause high stress concentration in the resulting composite leading to its failure prematurely.

A number of techniques may be used to insure that the deposited layer of filaments are substantially maintained in their position. Preferably, the slip-cast layer is sufficiently moist so that the filaments can be pressed into its surface. In another technique, a plurality of parallel grooves is molded into the surface of the moist ceramic layer, a filament is deposited in each groove and some suspension is deposited on the end portions of the deposited filaments whereby liquid vehicle is absorbed by the supporting ceramic layer leaving ceramic material on the filaments which maintains them in position and prevents contact between filaments. If the deposited filaments extend beyond the ceramic layer, their ends can be taped down or positioned by insertion into the spaces of a screen of a mesh size that is consistent with the desired filament to filament spacing.

The suspension is then poured on the filaments and liquid vehicle is extracted therefrom, either by and/or through the preceding slip-cast layer, to produce a layer of ceramic material which covers the filaments producing a compact wherein the filaments are embedded in a mixture of fibers and particulates. The entire procedure may be repeated to produce the desired compact or preform. Preferably, there is no significant contact between layers of filaments.

The slip-cast compact can be dried in a conventional manner, preferably under ambient conditions.

The slip-cast layer of compact can be recovered from the mold in a conventional manner.

MOLDABLE CERAMIC MASS EMBODIMENT

In this embodiment, the liquid vehicle is removed from the suspension in an amount sufficient to produce a ceramic mass which is moldable at ambient temperature. Generally, the moldable ceramic mass contains the liquid vehicle in an amount ranging from about 33% by volume to about 66% by volume, frequently from about 35% by volume to about 55% by volume, of the moldable ceramic mass. The particular amount of liquid left in the ceramic mass depends largely on the plasticity desired at ambient temperature.

Preferably, in this embodiment, at least part of the liquid vehicle is comprised of a liquid humectant in an amount effective to maintain a sufficient amount of liquid in the resulting damp ceramic mass under ambient conditions to keep it plastically shapable at ambient temperature for at least one day. Generally, the humectant ranges in amount from about 0.5% by volume to about 20% by volume of the total volume of liquid vehicle. Generally, the humectant is an organic material which can be removed, usually evaporated away or thermal decomposed at a temperature ranging from greater than about 50° C. to about 600° C., leaving no residue or no residue detectable by x-ray diffraction analysis. Representative of useful humectants is ethylene glycol and glycerol.

By a moldable, i.e. plastically shapable, ceramic mass, it is meant herein that at ambient temperature, i.e., a temperature generally ranging from about 20° C. to about 25° C., the ceramic mass will flow or deform under applied pressure and retain the shape so induced.

The amunt of pressure applied to the ceramic mass is determinable empirically and depends largely on its plasticity. Generally, the applied pressure ranges from about 1 psi to about 1000 psi at ambient temperature.

The ceramic mass can be molded by a number of conventional techniques. For example, it can be injection molded, die pressed or shaped manually to the desired shape. The ceramic mass can be molded into a simple, complex and/or hollow shaped body. For example, it can be shaped into the form of a gear or a dish.

More specifically, to carry out this embodiment, the ceramic mass may be molded to produce a first layer of the desired compact. A layer of filaments then may be deposited on the molded first layer in the same manner as disclosed in the slip casting embodiment. A layer of the moldable mass may then be deposited on the filaments forming substantially a sandwich structure and pressed causing it to adhere to the first molded layer and causing the filaments to be embedded between the two layers producing the present compact. The entire procedure may be repeated to produce the desired compact. Preferably, each preceding and succeeding molded ceramic layer contains sufficient moisture to form a direct bond therebetween on the application of relatively low pressure, i.e. less than about 100 psi. If desired, a layer of suspension may be deposited over the filaments before the second molded layer is deposited thereon to promote or form a bond therebetween.

If desired, several combinations of the slip casting and molding embodiments can be used to produce the desired compact or preform. For example, the moldable ceramic mass may be molded into a layer, a layer of filaments may be deposited thereon, followed by slip casting a ceramic layer over the filaments. Alternatively, the slip-cast layer may be formed initially, a layer of filaments may be deposited thereon, followed by molding a layer of the moldable ceramic mass over the filaments.

By a "compact" herein, it is meant the moist or dry compact produced by the present slip casting and/or molding embodiments wherein the compact is comprised of a mixture of discontinuous ceramic fibers and particulates surrounding a layer of continuous filaments which is embedded therein. Generally, the layer of continuous filaments is encapsulated by the mixture of fibers and particulates. The filaments in the compact are at least substantially parallel to each other and extend at least substantially through a section of the compact.

By a "preform" or "ceramic body" herein, it is meant the dried or heated compact which is to be infiltrated with molten ceramic to produce the present composite.

Generally, the compact or preform is formed into the shape and has the dimensions required of the composite. The compact and preform can be in any form desired, such as, for example, it can be hollow and/or of simple shape and/or of complex shape.

In a specific embodiment, before the present compact is dry, it usually has sufficient mechanical strength to be handled and sufficient drapability, depending on its moisture content, which allows it to be draped around a mold to produce a compact of desired configuration, dried and recovered in a conventional manner.

The present compact, i.e. one which is produced by slip casting and/or molding, is treated, for example dried or heated in air at ambient pressure or under a partial vacuum at a temperature ranging from about ambient to about 600° C., to remove its liquid content and any organic material therein removable at such temperature leaving no residue or no residue detectable by x-ray diffraction analysis. Frequently, the compact may be dried at a temperature ranging from about ambient to about 150° C. Generally, it is heated at a temperature ranging from greater than about 50° C. to about 600° C. to vaporize, thermally decompose and burn away organic material therein which is removable at these temperatures.

The present preform or ceramic body has an open porosity generally ranging from about 30% by volume to about 80% by volume, and frequently from about 40% by volume to about 60% by volume, of the body. It can be infiltrated with a molten ceramic which is a matrix-forming material to form a composite. The resulting solid composite generally is of substantially the same shape and size as the preform which was infiltrated. The filaments, fibers and filler particles are reinforcement material and form the reinforcement phase in the composite.

To carry out infiltration, the infiltrant is placed in contact with the compact or preform and such contact can be in a number of forms. Preferably, to promote rapid uniform melting desired to initiate infiltration, infiltrant powder is compacted into a pressed powder form or it is used in the form of large granules. Preferably, a layer of infiltrant is deposited on as large as possible a surface area of the compact or preform to promote infiltration.

Preferably, the amount of infiltrant in contact with or deposited on the compact or preform is sufficient to infiltrate the compact or preform to produce the present composite so that infiltration can be completed in a single step. However, if desired, the compact or preform can be partialy infiltrated and the infiltration repeated until the present composite is produced.

Should the reinforcement material contain desorbable material on its surface, the structure comprised of the infiltrant in contact with the compact preferably is heated initially to an elevated temperature below the melting point of the infiltrant, typically from about 800° C. to below the melting point of the infiltrant, for a period of time sufficient to degas the compact, typically for about 10 minutes.

Degassing temperature and time are determinable empirically. Generally, such degassing is necessary when the reinforcement material has desorbable material on its surface, such as hydrogen chloride, which would lead to gas evolution during the infiltration causing gas pockets or gross porosity. The completion of degassing is indicated by the stabilization of the pressure in the furnace.

After degassing, if any, the temperature is increased to a temperature at which the infiltrant is liquid and the reinforcement material is solid to infiltrate the liquid infiltrant into the open pores of the compact or preform. The infiltration temperature ranges from the liquidus temperature of the infiltrant to a temperature at which no significant vaporization of the infiltrant occurs. By liquidus temperature herein, it is meant the temperature at which melting of the infiltrant is complete on heating. Generally, with increasing infiltration temperature, the viscosity of the infiltrant decreases. At infiltration temperature, the infiltrant has a viscosity of less than about 50 poises, preferably less than about 5 poises, and more preferably less than about 1 poise. The particular infiltration temperature is determinable empirically and for several infiltrants it ranges from about 1300° C. to about 1900° C. Preferably, to prevent significant vaporization of the infiltrant, infiltration is carried out at as low a temperature as possible, and preferably no higher than about 50° C. above the liquidus temperature of the infiltrant. To ensure infiltration of the compact or preform, the entire compact or preform should be above the liquidus temperature of the infiltrant during infiltration. Infiltration time can vary, but generally infiltration is completed within about an hour.

Generally, the heating rate up to below or just below the melting point of the infiltrant ranges up to about 100° C. per minute. Commencing just below the melting point of the infiltrant, i.e. preferably within about 15 degrees of the onset of the melting, and continuing to the maximum infiltration temperature, the heating rate preferably ranges from about 1° C. per minute to about 10° C., more preferably from about 1° C. per minute to about 5° C. per minute, to facilitate controlled infiltration of the liquid infiltrant into the porous compact or preform. Overheating may cause significant vaporization of the infiltrant and may interfere with the present infiltration and also may cause undsirable deposition in the heating apparatus.

The infiltration process is carried out in an atmosphere or vacuum in which the reinforcement phase material and infiltrant are inert or substantially inert, i.e., an atmosphere or vacuum which has no significant deleterious effect thereon. Specifically, the process atmosphere or vacuum should be one in which no significant reaction between the reinforcement material and infiltrant takes place. Reaction between the reinforcement material and infiltrant will degrade the mechanical properties of the resulting composite. The process atmosphere or vacuum should maintain the inertness of the reinforcement material so that no reaction between the reinforcement material and infiltrant takes place which is detectable by scanning electron microscopy. Also, the process atmosphere or vacuum should be non-oxidizing with respect to the reinforcement material. The particular process atmosphere or vacuum is determinable empirically and depends largely on the reinforcement material used. The process atmosphere or vacuum can be comprised of or contain nitrogen, a noble gas, preferably argon or helium, and mixtures thereof. However, when the reinforcement material is a ceramic carbide, the process atmosphere or vacuum preferably should contain at least a partial pressure of carbon monoxide determinable empirically or by thermodynamic calculation which is at least sufficient to prevent reaction or significant reaction between the carbide and infiltrant. Also, when the reinforcement material is a ceramic nitride, the process atmosphere or vacuum preferably should contain at least a partial pressure of nitrogen determinable empirically or by thermodynamic calculation which is at least sufficient to prevent reaction or significant reaction between the nitride and the infiltrant, and preferably the atmosphere is nitrogen.

To carry out infiltration, the pressure of the process atmosphere or vacuum can vary widely and is determinable empirically or by thermodynamic calculations and depends largely on the dissociation and/or reaction pressures of the particular reinforcement material and infiltrant and the temperature required for infiltration. More specifically, the process atmosphere or vacuum can range from below to above ambient pressure, and preferably it is at ambient, i.e. atmospheric or about atmospheric. When the process atmosphere is at reduced pressure, typically it can range from about 0.1 torr up to ambient, and frequently, it ranges from about 100 torr to about 400 torr. When the process atmosphere is above ambient, it is convenient to restrict it to about 10 atmospheres.

When infiltration is completed, the infiltrated preform is allowed to solidify producing the present composite. The rate of cooling should have no significant deleterious effect on the composite. Specifically, the infiltrated preform should be cooled at a rate which avoids cracking of the resulting composite, and this is determinable empirically depending largely on the geometry and size of the infiltrated preform. Generally, a cooling rate of less than about 50° C. per minute is useful for small bodies of simple shape and a cooling rate as great as about 20° C. per minute or higher is useful for large bodies of complex shape. Preferably, the infiltrated preform is cooled to ambient temperature prior to removal from the heating apparatus.

Any excess infiltrant on the surface of the composite can be removed by a number of techniques, such as, for example, by gentle scraping or abrading.

The present composite does not contain any reaction product of reinforcement material and infiltrant, i.e. matrix-forming material, which is detectable by scanning electron microscopy.

The present composite has a porosity of less than about 10% by volume, preferably less than about 5% by volume, more preferably less than 1% by volume, and most preferably, it is pore-free, i.e., it is fully dense.

The present composite is comprised of from about 20% by volume to about 70% by volume, preferably from about 40% by volume to about 60% by volume, of reinforcement phase and from about 30% by volume to about 80% by volume, preferably from about 40% by volume to about 60% by volume, of continuous matrix phase. Generally, the composition of the continuous matrix phase is substantially the same or not significantly different from that of the infiltrant.

Generally, in the present composite, the continuous matrix phase is distributed evenly or substantially evenly through the composite. In the present composite, the continuous matrix phase is interconnecting and generally envelops, i.e. encapsulates, more than 25% by volume, preferably more than 50% by volume, of the individual reinforcement members, i.e., fibers, filaments and filler particulates.

The present composite can contain an amorphous glassy phase, generally in an amount of less than about 5% by volume, preferably less than about 2% by volume, and more preferably less than about 1% by volume, of the composite. Even more preferably, the present composite contains only a detectable amount of glassy phase. Ideally the composite would contain no glassy phase. The amount of glassy phase in the composite depends largely on the impurities in the starting materials.

The present invention makes it possible to fabricate a composite of the desired shape and size directly. For example, the present composite can be in the form of a flat body, a curved thin body, a hollow shaped article, a long rod, or a wear resistant part such as a cam follower. Since the present composite can be produced in a predetermined configuration of predetermined dimensions, it would require little or no machining.

The present composite has a number of uses. For example, it is useful as a high temperature structural material, a heat exchanger surface, an aircraft engine control surface, a valve stem, or as a vane, and as a wear resistant part such as a cam follower.

The invention is further illustrated by the following examples where the procedure was as follows unless otherwise stated:

Commercially available crystalline whiskers of silicon carbide having an aspect ratio of about 100:1, i.e. a length of about 30 microns and a diameter of about 0.3 microns, was used.

Crystalline silicon carbide powder having an equivalent diameter of about $0.8\mu$ was used.

25 grams of the silicon carbide whiskers, 75 grams of the silicon carbide powder, 225 grams of water and a mold release agent in an amount of 1.8% by weight of the water were ball milled for 15 hours under ambient conditions to form a suspension. The mold release agent was an alginate sold under the trademark Keltex. The mixture was too dilute to comminute the individual whiskers. The ceramic material was uniformly distributed in the resulting suspension. The volume of ceramic solids was 12.2% by volume of the suspension, the volume fraction of whiskers was 3.1% by volume of the suspension and the volume ratio of whiskers to particulates was about 1:3.

Each filament was about 45 mm long, about $140\mu$ in diameter and was comprised of a carbon core, about $15\mu$ in diameter, coated completely with silicon carbide.

A mold with a flat surface, i.e. a porous plaster slab, was used which was larger than the layer of filaments deposited.

The compacts were formed under ambient conditions.

EXAMPLE 1

The suspension was deposited on the flat surface of the mold which was allowed to absorb all the visible water therefrom leaving a first layer of ceramic material which was moist to the touch and which appeared to be substantially uniform with a thickness of about 0.5 mm and about $50 \times 50$ mm in width and length.

A scribe with predetermined spacing was used to cut parallel grooves across the face of the first layer which were spaced about 0.8 mm from each other. A continuous filament was deposited in each groove.

A thin layer of the suspension was deposited across all of the end portions of the filaments. Sufficient water was absorbed by the first ceramic layer leaving ceramic material covering the end portions which was allowed to dry slightly so as to maintain the filaments in position for subsequent processing.

Suspension was then deposited over the central portion of the filaments. The suspension spread out covering all of the filaments. Its visible water content was allowed to be absorbed by the first ceramic layer leaving a second moist ceramic layer which completely covered the filaments. The second ceramic layer was about the same size as the first layer.

The entire procedure was repeated four times, i.e. the scribe was used to cut grooves across the face of the second moist ceramic layer. A filament was placed in each groove followed by formation of a third ceramic layer thereon in the same manner. All of the layers of filaments were totally encapsulated in the resulting compact.

The compact was allowed to dry under ambient conditions for several days. The dried compact had an open porosity of about 60% by volume.

EXAMPLE 2

The mold was a porous plaster slab which had parallel grooves scribed across its surface. A filament was deposited in each groove.

Suspension was deposited on the end portions of all the filaments and the visible water was allowed to be absorbed therefrom by the mold leaving sufficient ceramic material covering the end portions of the filaments to maintain them in position.

A substantially uniform layer of suspension was then deposited over the exposed filaments and water was absorbed therefrom by the mold to leave a moist substantially uniform layer, about $50 \text{ mm} \times 50$ mm and about 0.5 mm in thickness.

The moist ceramic layer with the filaments embedded therein was removed from the mold and stored in a sealed container to maintain its moist condition.

This entire procedure was repeated three times producing four substrate ceramic layers, each with a layer of filaments embedded in its surface.

Sufficient suspension was then deposited over the first substrate layer including the filaments so as to completely wet the surface and to render the ceramic substrate layer sticky to the touch.

The second substrate layer was then pressed onto the just-formed sticky ceramic layer forming a sandwich therewith. A sticky ceramic layer was formed over the filaments of the second substrate layer in the same manner and the procedure was repeated until a compact was produced which contained four layers of filaments totally enveloped by the silicon carbide ceramic material.

The compact was allowed to dry under ambient conditions for several days. The dried compact had an open porosity of about 60% by volume.

EXAMPLE 3

This example illustrates the production of a moldable ceramic layer.

10.00 grams of the suspension were poured onto the mold and a sufficient amount of water was absorbed by the mold to produce a pliable plastic moldable mass in the form of a layer which weighed 3.70 grams. The moldable layer was then dried at 100° C. The weight of the dried layer was 2.75 grams indicating that the moldable layer contained about 0.95 grams of water, i.e. water was present in an amount of about 52% by volume of the moldable mass. The dried layer had an open porosity of about 52% by volume of the layer.

EXAMPLE 4

Ten parallel grooves were cut into a glass plate. The grooves were 0.2 mm in diameter and were spaced about 0.15 mm apart. A filament was deposited in each groove. A strip of tape was placed across the end portions of the filaments to hold them in place and the layer of parallel spaced filaments was lifted from the glass. Ten layers of filaments were produced in this manner.

Sufficient suspension was deposited on the mold which, after the visible water was absorbed therefrom, resulted in a moist ceramic layer of about 35 mm×12 mm and about 0.5 mm in thickness.

A layer of filaments was deposited on the moist ceramic layer and pressed into its surface, except for the taped ends which extended therefrom.

Sufficient suspension was deposited on the filaments, which after visible water was absorbed therefrom by the preceding ceramic layer, left a ceramic layer, moist to the touch, that covered the filaments and was about the same size as the preceding ceramic layer. A second layer of filaments was deposited and pressed into the surface of the just-formed moist ceramic layer and then covered with ceramic layer in the same manner. This procedure was repeated using all ten layers of filaments except that the very last formed ceramic layer was about 1.5 mm in thickness.

The resulting compact was dried in air under ambient conditions. The dried compact had an open porosity of about 60% by volume. A mixture of silicon carbide whiskers and particulates surrounded and embedded the filaments except for the portions of the filaments which protruded from the compact.

EXAMPLE 5

This is a paper example.

The compact produced in Example 1 could be fired at about 500° C. in air at ambient pressure for ½ hour to thermally decompose and evaporate away its content of alginate.

A layer of strontium silicate granules could be deposited on the compact or preform at ambient temperature. The amount of strontium silicate is sufficient to fill the open porosity of the preform. The resulting structure could be heated in an atmosphere of carbon monoxide or argon or mixtures thereof at ambient pressure or under a partial vacuum to a temperature of about 1600° C. at which the strontium silicate is molten and at which it infiltrates the open porosity of the preform. The infiltrated preform is then allowed to cool to ambient temperature. The resulting solid composite is comprised of a continuous matrix phase of strontium silicate and a phase of silicon carbide. It has an open porosity of less than 10% by volume. The shape and size of the composite is substantially the same as that of the preform which was infiltrated. The composite would be useful for strengthening a heat exchanger surface or as a structural piece.

What is claimed is:

1. A process for producing a slip-cast compact comprised of a mixture of fibers and particulates surrounding a layer of continuous filaments which comprises preparing a slip comprised of ceramic material suspended in a liquid, vehicle, said ceramic material being comprised of a mixture of fibers and particulates, said fibers being discontinuous and having an aspect ratio ranging from about 10 to less than about 200, said particulates having an equivalent diameter ranging from greater than about $0.2\mu$ to less than about $3\mu$, the volume ratio of said fibers to said particulates ranging from about 1:5 to about 1:1, at least about 90% by volume of said particulates being filler particulates, said ceramic material being present in an amount greater than about 4% by volume of said slip, said ceramic fibers being present in an amount greater than about 2% by volume of said slip, providing a porous mold, depositing a portion of said slip on a surface of the mold whereby sufficient liquid vehicle is extracted to produce a first layer of said compact, depositing a layer of a plurality of continuous filaments on said first layer of compact with said filaments being positioned substantially parallel to each other and extending at least substantially across said first layer of compact, said filaments having a melting or decomposition point above 1000° C., depositing a sufficient amount of said slip on said filaments whereby sufficient liquid vehicle is extracted forming a ceramic layer sufficient to cover said filaments and produce said compact, said filaments having been maintained substantially in said position, said fibers and filler particulates being selected from the group consisting of aluminum oxide, beryllium oxide, silicon carbide, silicon nitride, titanium carbide, titanium diboride, zirconium carbide, zirconium diboride and a mixture thereof, from 0 to about 10% by volume of said particulates being comprised of a ceramic meltable material which has a melting point ranging from a minimum of about 1000° C. to a maximum which is about 100° C. below the melting or decomposition point of said fibers, filler particulates and filaments and in its molten state wets said fibers, filler particulates and filaments.

2. The process according to claim 1 wherein said fibers and particulates are silicon carbide and said fibers are crystalline whiskers.

3. The process according to claim 1 wherein said porous mold contains a plurality of substantially parallel grooves, said first layer of compact is recovered therefrom with a plurality of substantially parallel grooves extending across its surface and a filament is deposited in each groove.

4. The process according to claim 1 wherein said layer of filaments is deposited and maintained in position by being impressed into the surface of said first layer of compact, and said first layer of compact is sufficiently moist to allow said filaments to be impressed therein.

5. The process according to claim 1 wherein slip is deposited on the end portions of said filaments supported by said first layer whereby sufficient liquid vehicle is extracted therefrom to leave ceramic material thereon which maintains said filaments substantially in said position.

6. The process according to claim 1 wherein said compact is heated to above 1000° C. and infiltrated with a molten ceramic to produce a composite having a porosity of less than 10% by volume, said infiltrated ceramic having a melting point ranging from a minimum of aout 1000° C. to a maximum which is about 100° C. below the melting or decomposition point of said fibers, filler particulates and filaments and in its molten state wets said fibers, filler particulates and filaments.

7. A process for producing a compact comprised of a mixture of fibers and particulates surrounding a layer of continuous filaments which comprises preparing a suspension of ceramic material in a liquid vehicle, said ceramic material being comprised of a mixture of fibers and particulates, said fibers being discontinuous and having an aspect ratio ranging from about 10 to less than about 200, said particulates having an equivalent diameter ranging from greater than about $0.2\mu$ to less than about $3\mu$, the volume ratio of said fibers to said particulates ranging from about 1:5 to about 1:1, at least about 90% by volume of said particulates being filler particulates, said ceramic material being present in an amount greater than about 4% by volume of said suspension, said ceramic fibers being present in an amount greater than about 2% by volume of said suspension, removing a sufficient portion of said liquid vehicle to leave a moldable ceramic mass, molding part of said moldable ceramic mass producing ceramic layers of said compact, depositing a layer of a plurality of continuous filaments on a first layer of compact with said filaments being positioned substantially parallel to each other and extending at least substantially across said first layer of compact, said filaments having a melting or decomposition point higher than 1000° C., depositing a second ceramic layer over said filaments forming substantially a sandwich structure with said first layer, and pressing said second ceramic layer causing it to adhere and embed said filaments producing said compact, said filaments having been maintained substantially in said position, said fibers and filler particulates being selected from the group consisting of aluminum oxide, beryllium oxide, silicon carbide, silicon nitride, titanium carbide, titanium diboride, zirconium carbide, zirconium diboride, and a mixture thereof, from 0 to about 10% by volume of said particulates being comprised of a ceramic meltable material which has a melting point ranging from a minimum of about 1000° C. to a maximum which is about 100° C. below the melting or decomposition point of said fibers, filler particulates and filaments and in its molten state wets said fibers, filler particulates and filaments.

8. The process according to claim 7 wherein said ceramic layers have sufficient moisture which bonds them together during said pressing.

9. The process according to claim 7 wherein a layer of suspension is deposited on said filaments before said second molded layer is deposited thereon.

10. The process according to claim 7 wherein said layer of filaments is deposited and maintained in position by being impressed into the surface of said first layer of compact, and said first layer of compact is sufficiently moist to allow said filaments to be impressed therein.

11. The process according to claim 7 wherein said compact is heated to above 1000° C. and infiltrated with a molten ceramic to produce a composite having a porosity of less than 10% by volume, said infiltrated ceramic having a melting point ranging from a minimum of about 1000° C. to a maximum which is about 100° C. below the melting or decomposition point of said fibers, filler particulates and filaments and in its molten state wets said fibers, filler particulates and filaments.

12. A process for preparing a compact which comprises preparing a suspension comprised of ceramic material suspended in a liquid vehicle, said ceramic material being comprised of a mixture of fibers and particulates, said fibers being discontinuous and having an aspect ratio ranging from about 10 to less than about 200, said particulates having an equivalent diameter ranging from greater than about $0.2\mu$ to less than about $3\mu$, the volume ratio of said fibers to said particulates ranging from about 1:5 to about 1:1, at least about 90% by volume of said particulates being filler particulates, said ceramic material being present in an amount greater than about 4% by volume of said suspension, said ceramic fibers being present in an amount greater than about 2% by volume of said suspension, taking a part of said suspension and removing a sufficient portion of said liquid vehicle therefrom to leave a moldable ceramic mass, molding said moldable ceramic mass into a first ceramic layer of said compact, depositing a layer of a plurality of continuous ceramic filaments on said first layer of compact with said filaments being positioned substantially parallel to each other and extending at least substantially across said first ceramic layer, said filaments having a melting or decomposition point higher than 1000° C., depositing a sufficient amount of said suspension on said filaments and removing sufficient vehicle to produce a second ceramic layer of said compact which covers said filaments and produces said compact, said filaments having been maintained substantially in said position, said fibers and filler particulates being selected from the group consisting of aluminum oxide, beryllium oxide, silicon carbide, silicon nitride, titanium carbide, titanium diboride, zirconium carbide, zirconium diboride and a mixture thereof, from 0 to about 10% by volume of said particulates being comprised of a ceramic meltable material which has a melting point ranging from a minimum of about 1000° C. to a maximum which is about 100° C. below the melting or decomposition point of said fibers, filler particulates and filaments and in its molten state wets said fibers, filler particulates and filaments.

13. The process according to claim 12 wherein said fibers and particulates are silicon carbide and said fibers are crystalline whiskers.

14. The process according to claim 12 wherein said first layer of compact is molded with a plurality of substantially parallel grooves extending across its surface and a filament is deposited in each groove.

15. The process according to claim 12 wherein said layer of filaments is deposited and maintained in position by being impressed into the surface of said first layer of compact, and said first layer of compact is sufficiently moist to allow said filaments to be impressed therein.

* * * * *